Nov. 12, 1968    R. E. LINKER    3,409,930
HEATED WINDSHIELD WIPER WITH REFLECTOR MEANS
Filed Aug. 10, 1967
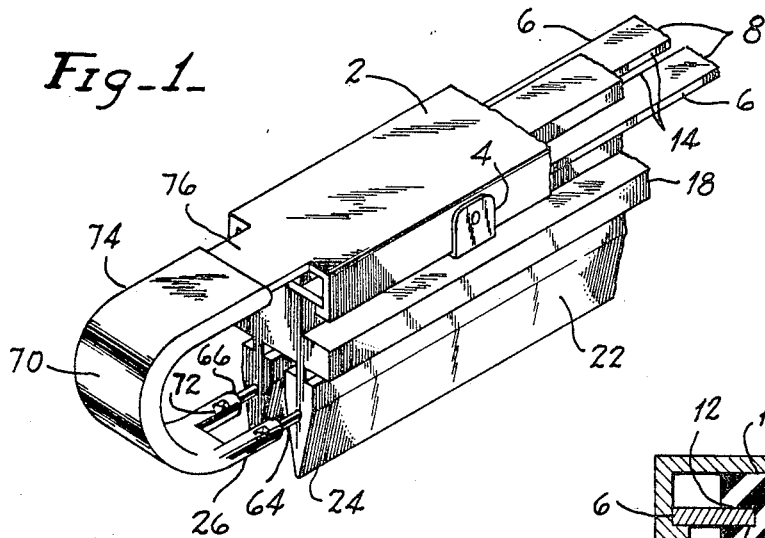
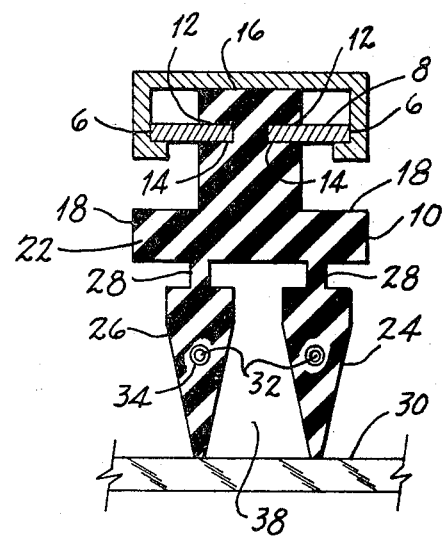
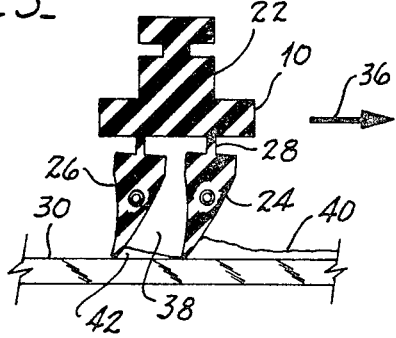
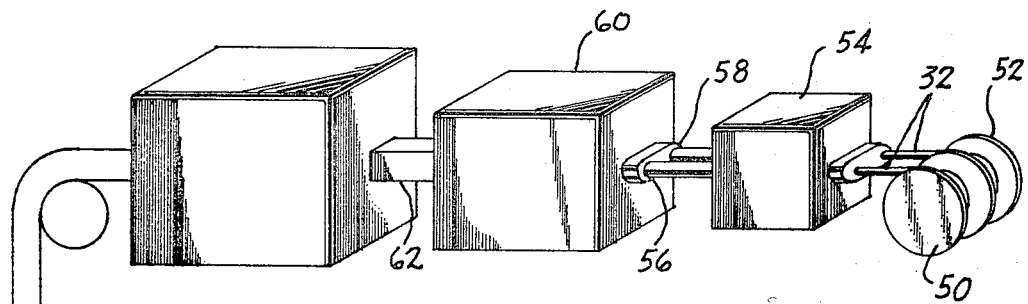
INVENTOR.
Roy E. Linker
BY Sperry and Zoda
Attorneys United States Patent Office 3,409,930
Patented Nov. 12, 1968

3,409,930
HEATED WINDSHIELD WIPER WITH
REFLECTOR MEANS
Roy E. Linker, Nursery Road, Titusville, N.J. 08560
Filed Aug. 10, 1967, Ser. No. 659,695
7 Claims. (Cl. 15—250.06)

ABSTRACT OF THE DISCLOSURE

An integral extruded windshield wiper blade embodying two spaced parallel flexible wiping elements each of which embodies a heating element, the parallel elements cooperating to define a heat concentrating channel between the blade wiping elements.

Background of invention

Numerous patents have been granted on windshield wiper constructions wherein an electrical heating element is provided for heating the wiper blade or for heating the surface of the windshield adjacent the wiping blade to promote the removal of frost or ice from a windshield as the wiper is oscillated back and forth over a windshield. Most constructions of this type are relatively complicated and expensive in construction and are not capable of being produced economically by an extrusion operation such as that disclosed in the applicant's U.S. Patent No. 3,201,818.

It has further been suggested that the melting and removal of ice and snow from a windshield may be promoted by locating heating elements on opposite sides of a wiper blade so as to increase the width of the zone adjacent the wiper blade which is heated and to reduce the accumulation of ice or snow on the wiper blade itself. However, constructions of this type have not been designed or capable of use with existing and conventional backing strips and blade mounting assemblies. Moreover they do not assure the successive engagement of heated wiping blades so as to initiate the melting of ice or snow and also remove the resulting water and softened or loosened ice accumulation before they can refreeze on the windshield. As a result prior heated windshield wiper constructions frequently actually spread or smear ice accumulations across the surface of the windshield in a manner to further obscure the vision of the driver.

Summary of invention

In accordance with the present invention these and other objections and limitations inherent in heated windshield wipers of the prior art are overcome and a novel type of windshield wiper blade is provided which may be mounted on existing or conventional wiper blade assemblies and which possesses improved wiping characteristics particularly when the wiping elements are heated. For this purpose the wiper blade is formed as a unitary elongated strip, which preferably is produced by extrusion methods, and has a head or base portion from which two parallel spaced wiping elements project into position to engage the surface of the windshield. Each wiping element is provided with its own heating element whereby both elements may be heated when desired so that snow or ice contacted by one element will be further contacted by the other element and by the heated air confined in the space between the two elements. In this way the water formed by melting of ice or snow by the first wiping element will remain in the form of a softened or loosened ice or water and will be wiped off the windshield before it can refreeze or smear over the surface of the windshield. Moreover, the ice which is only partially or incompetely melted by contact with the first wiping element moving across the same, will be more completely and effectively melted by the action of the heated air or water within the space between the wiping elements so as to be removed by the second wiping element which contacts the same.

The drawings

FIG. 1 is a perspective illustrating a portion of a typical windshield wiper blade embodying the present invention, FIG. 2 is an enlarged view in cross section of the form of windshield wiper blade illustrated in FIG. 1, FIG. 3 is a further cross sectional view of the windshield wiper blade of FIGS. 1 and 2 indicating one position to which the wiping elements of the blade may move during operation, and FIG. 4 is a diagrammatic illustration of typical equipment which may be employed in the manufacture of windshield wiper blades in accordance with the present invention.

Preferred embodiment

In that form of the invention chosen for purposes of illustration in the figures of the drawing, the windshield wiper blade is adapted to be mounted on any suitable or conventional type of blade holding assembly which may, if desired, be of the type shown and described in applicant's co-pending application, S.N. 573,109, filed Aug. 17, 1966. For this purpose as shown in FIG. 1, the wiper blade assembly is provided with a lever member 2 which is pivotally connected to the actuating arm of a windshield wiper or other suitable mounting and actuating means. Holding means 4 are pivotally connected to the lever member 2 and embrace the opposite projecting edges 6 of a conventional longitudinally slotted flexible metal backing strip 8 or other suitable means for use in securing the wiper blade to the lever members or other elements of a wiper blade assembly.

The wiper blade illustrated has a body portion 10 which preferably is provided with slots 12 at opposite sides thereof for receiving the inner edges 14 of the slotted backing strip 8. A head portion 16 of the wiper blade is positioned above the backing strip for holding the wiper blade in place with respect to the backing strip while permitting the wiper blade to be applied to and removed from the backing strip in a conventional manner.

The wiper blade is further provided with laterally extending flanges 18, designed to be located beneath the lower inturned extremities 20 of the holding means 4 carried by the lever members 2.

The wiper blade of the present invention is indicated generally at 22 and embodies two similar and parallel, spaced wiping elements indicated at 24 and 26 which are connected to the body 10 of the windshield wiper by relatively thin and flexible neck portions 28. In this way the wiping elements 24 and 26 are formed so as to be readily flexed transversely with respect to the body 10 of the windshield wiper blade as the wiper is moved back and forth across the surface of a windshield 30 such as that indicated in FIG. 3. Further, in accordance with the present invention, each of the wiping elements 24 and 26 is provided with a heating element 32 in the form of a "Nichrome" wire or other electrical resistance element. If desired, the heating elements 32 may also be provided with a thermal and electrical insulating coating 34 to prevent overheating of that portion of the rubber or plastic material used in forming the windshield wiper blade is directly adjacent to the heating element.

As shown in FIG. 3, when using the form of windshield wiper illustrated in FIGS. 2 and 3 for removing ice and snow from the surface of a windshield 30, the wiper blade will be oscillated back and forth across the surface of the windshield. Thus, as the wiper blade moves to the right, in the direction indicated by the arrow 36 in FIG. 3, the wiping element 24 will tilt about the neck portion 28 thereof and with respect to the body 10 of the wiper blade. In a similar way the wiping element 26 will be tilted so as to maintain the two wiping elements 24 and 26 in substantially parallel spaced relation with a space or heating chamber 38 therebetween.

As the wiper moves in the direction of the arrow 36, the element 24 will serve to remove loose snow or ice from the windshield as indicated at 40. At the same time the heat generated by the resistance element 32 in the wiping element 24 will tend to melt or soften the ice or snow indicated at 42 which adheres so firmly to the windshield 30 as to resist the wiping action of the wiping element 24. The resulting softened ice 42 which was contacted by the wiping element 24, and a portion of the water produced by melting of the ice on the windshield, may remain on the windshield as the wiping element 24 passes over the same. This remaining ice and/or water will then be subjected to the action of the heated space or air chamber 38 between the wiping elements 24 and 26 so as to further promote the melting of the ice 42. Continued movement of the wiper blade to the right as indicated by the arrow 36 will then cause the second wiping element 26 to sweep the water and melted ice across the windshield and out of the area of vision of the driver of the automobile or other vehicle on which the windshield wiper is located. In this way, it is possible to subject the ice on the surface of the windshield to three successive melting actions, due to the first wiping element 24 and its heating element 32, then to the relatively warm air entrapped between the wiping elements 24 and 26 within the space or chamber 38, and then to the final melting and wiping action resulting from the movement of the second heated wiping element 26 across the surface of the windshield. The resulting action of the windshield wiper blade is one which affords not only rapid melting of ice or snow which has accumulated on the windshield, but also an effective squeegee action which serves to remove the water and softened ice produced so as to prevent the water and ice from refreezing on the surface of the windshield between the successive oscillations of the windshield wiper blade across the surface of the windshield.

While windshield wiper blades embodying the present invention may be produced in any suitable or preferred manner, as for example, by molding or otherwise, the construction of the wiper blades described above lends itself to production by extrusion operations such as those described in applicant's U.S. Patent No. 3,201,818. Accordingly, as shown diagrammatically in FIG. 4, the wiper blade may be produced by drawing two wires 32 from adjacent drums 50 and 52, and passing the same through an insulation applying device 54, if insulation is desired. The heating elements 32, with or without insulation may then be passed through the tubes 56 and 58 of an extrusion device 60 so as to issue from the extrusion device as a continuous strand of wiper blade forming material 62 having the cross-sectional form illustrated in FIG. 2. The product thus obtained may then be served into suitable lengths to form individual windshield wiper blades of any desired length. The length of the wiper blade producing section thus produced may be sufficiently longer than the wiper blade itself to permit the plastic wiper blade forming material to be stripped from the heating elements as shown at 64 in FIG. 1. If the heating element 32 has insulation applied thereto such insulation may be further stripped off the heating element for a short distance adjacent the free ends thereof as indicated at 66 for establishing a flexible electrical connection to the lever member or other element 2 of the wiper blade assembly.

In the preferred usage of the wiper blade strip produced, the plastic material may be removed from the heating elements 32 and an electrical connection between the heating elements and the element 2 of the wiper blade assembly is established by means of a clip or connector 70 having prongs 72 designed to penetrate the insulation 34, if present, to contact the heating element. The connector 70 has a portion 74 designed to slidably receive a tab 76 on the element 2 so as to permit the tab to be crimped into retaining and electrically conducting contact with the tab 76 and element 2. In this way the heating elements 32 may be included in an electrical circuit for energizing the same when desired in order to remove snow, ice or frost from the windshied of a vehicle whenever that should become necessary. At the same time the windshield wiper blade may be utilized during summer or at other times to provide dual wiping elements for assuring the most effective wiping of rain or water from the windshield at any and all times.

While the windshield wiper blade and the wiping elements thereof are shown in the drawings as having a typical form and shape in cross-section, it will be apparent that the particular shape of the wiper blade, and the type of backing strip and mounting means employed are capable of many and various changes and modifications in the form and construction thereof. In view thereof it should be understood that the embodiment of the invention shown in the drawings and described above is intended to be illustrative only and is not intended to limit the scope of the invention.

I claim:

1. A windshield wiper assembly embodying a unitary wiper blade formed with two flexible spaced and parallel wiping elements having an air space therebetween, each of said wiping elements having an electrical heating element embedded therein.

2. A windshield wiping assembly as defined in claim 1 wherein said wiper blade is provided with a body and said wiping elements are connected to said body by flexible neck portions.

3. A windshield wiping assembly as defined in claim 1 wherein said wiper assembly includes a slotted backing strip and said wiper blade has a body with a body portion provided with grooves in the opposite sides thereof receiving the adjacent edges of the slotted backing strip.

4. A windshield wiper assembly as defined in claim 1 wherein means are connected to an electrically conducting element of the assembly and to the heating elements of the windshield wiping elements to energize said heating elements.

5. A windshield wiper assembly as defined in claim 1 wherein the wiper blade consists of an extruded strand of material and an electrical connector is in electrical contact with the heating elements in each of said wiping elements and is also electrically connected to an electrically conducting element of said windshield wiper assembly for energizing said heating elements.

6. A windshield wiper assembly as defined in claim 1 wherein said wiper blade consists of an extruded strand of material and said heating elements project from the ends of said wiping elements and are electrically connected to a conducting member of the windshield wiper assembly for energizing said heating elements.

7. A windshield wiper assembly as defined in claim 1 wherein the wiper blade consists of an extruded strand of material, the heating elements are provided with electrical insulation and project from the ends of the wiping elements, the insulation is removed from the projecting ends of the heating elements, and the thus exposed ends of the heating elements are electrically connected to a conducting member of the wiper assembly for energizing said heating elements.

References Cited

UNITED STATES PATENTS

| | | | |
|---|---|---|---|
| 1,641,336 | 9/1927 | Klapper | 15—250.08 |
| 2,012,814 | 8/1935 | Herzog | 15—250.09 |
| 2,089,357 | 8/1937 | Grece | 15—250.07 |
| 2,302,780 | 11/1942 | Le Clair | 15—250.06 |
| 2,354,440 | 7/1944 | Brown | 15—250.41 XR |
| 2,721,351 | 10/1955 | Nitzel et al. | 15—250.06 |
| 3,201,818 | 8/1965 | Linker | 15—250.06 |

FOREIGN PATENTS 1,282,710  12/1961  France.

PETER FELDMAN, *Primary Examiner.*